United States Patent
Cui et al.

(10) Patent No.: US 6,587,586 B1
(45) Date of Patent: Jul. 1, 2003

(54) EXTRACTING TEXTUAL INFORMATION FROM A VIDEO SEQUENCE

(75) Inventors: Yuntao Cui, Plainsboro, NJ (US); Qian Huang, Cranbury, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 08/999,903

(22) Filed: Jun. 12, 1997

(51) Int. Cl.[7] .................. G06K 9/34; G06K 9/46; G06K 9/56; G06K 9/36; G06N 3/00
(52) U.S. Cl. ............ 382/176; 382/192; 382/205; 382/236; 382/237; 706/13
(58) Field of Search ............... 382/176, 190, 382/236, 192, 195, 205, 237; 706/12, 13, 14; 345/501, 520

(56) References Cited

U.S. PATENT DOCUMENTS

| | | | |
|---|---|---|---|
| 5,255,345 A | * 10/1993 | Shaefer | 706/13 |
| 5,729,623 A | * 3/1998 | Omatu et al. | 382/135 |
| 6,081,750 A | * 6/2000 | Hoffberg et al. | 345/520 |
| 6,101,274 A | * 8/2000 | Pizano et al. | 382/176 |

OTHER PUBLICATIONS

Ohya et al, Recognizing Characters in Scene Images, Feb. 1994, IEEE Transactions ISBN: 0162–8828, vol. 16, No. 2, pp. 214–220.*

Michael Gordon, Probabilistic and Genetic Algorithms for Document Retrieval, Oct. 1988, Communications of the ACM, ISBN: 0001–0782, vol. 31, No. 10, pp. 1208–1218.*

* cited by examiner

Primary Examiner—Mehrdad Dastouri
(74) Attorney, Agent, or Firm—Donald B. Paschburg (57) ABSTRACT

A method for extracting an image representing textual information from a video sequence includes the following steps. First, receiving a sequence of video frames, each including an image of textual information. Then, locating the textual information in each frame of the video sequence to form a stack of text arrays, each array containing data representing substantially only the textual information. Finally, extracting a single textual image array representing the image of the textual information from the stack of text arrays. Apparatus for extracting an image representing textual information from a video sequence includes a source of a video sequence having a plurality of frames, each containing an image of the textual information; and a processor, coupled to the video sequence source, responsive to all of the plurality of frames, for generating a single array representing an image of the textual information.

19 Claims, 4 Drawing Sheets

EXTRACTING TEXTUAL INFORMATION FROM A VIDEO SEQUENCE

The present invention relates to the extraction of textual information from a sequence of video frames in which each frame includes an image portion containing the textual information.

It has become important to be able detect and recognize textual information from images of that information. One application is tracking the identity of automobiles through their license plates, for example for automatic traffic violation control, automatic parking lot billing, etc. Another application is tracking the content and identity of boxes and other containers through labels attached to them, for example, production tracking of factory material and routing of finished goods or outgoing packages. Many other applications exist for such technology. In these applications, a camera scans an area of interest. When textual information of interest passes through the visual field of the camera, an image of the textual information is temporarily stored. That image is analyzed to locate the textual information in that image. The image of the textual information in the full image is extracted. The text is then recognized from the textual information image. For example, a camera might be located at an exit of a parking lot to take a picture of departing cars. When a car leaves the lot, the picture containing the image of the car is stored in a memory. From this image the license plate within the image of the car is located. Then the image of the characters on the license plate is extracted. Finally, the actual text on the license plate is recognized from the character image for billing purposes.

Much work has been done in the area of recognizing the textual information from the image of that information; for example, recognizing the letter "A" from the image of an "A". This is termed optical character recognition (OCR). However, before the OCR operation can occur, the character images must be extracted. The present application is related to the character image extraction operation. Various approaches exist in the prior art.

In general, the textual information is assumed to be an image with the character being one color on a background of a contrasting color. For example, on license plates, it may be assumed that dark or black characters are placed on a light or white background. The previously located area containing the textual information within the image (i.e. the license plate) is converted to an array of pixels, each pixel having a value representing the brightness of the pixel. One approach to character image extraction has been to use a global threshold. In this approach, A global threshold is established. If the value of the pixel is on one side of the threshold (for example, greater than the threshold) that pixel is assumed to be a character image pixel, and if it is on the other side of the threshold (i.e. less than the threshold) that pixel is assumed to be a background image pixel. Prior art approaches also apply global contrast enhancement prior to character extraction. This approach does not work well in real life applications. First, the resolution of the textual information is usually low because the original image in which the textual information resides contains much more information than the textual information alone, for example, the parking lot image described above contains an image of the entire car, and the license plate is a small percentage of the whole scene, containing a small percentage of the pixels contained in the whole scene. Second, global thresholding and contrast enhancement operates accurately only when the scene being processed is uniformly illuminated and not too noisy. This is seldom the case in real life applications.

In the paper "Morphology Based Thresholding for Character Extraction" *IEICE Transactions on Inf. & Syst.*, E76-D(10):1208–1215, 1993; a method is described for extracting character images in which characters are considered as "ditches" formed of two edges of opposite directions. Morphological operators enhance the area within the ditch. This method works when the contrast between characters and the background is high, but not when the contrast is low, which can occur in real life applications.

Other approaches to character extraction utilize adaptive thresholding, in which thresholds are derived from local regions, instead of globally. Such methods can deal with images which are not illuminated uniformly. However, the accuracy of such methods does depend on the selection of the local regions. If the local regions are selected such that the image of a single character spans two regions, a broken character might result if the thresholds selected for the two regions are different. One solution to this problem is to select and then grow a region in an attempt to ensure that the image of a single character is contained within a single region.

All the above prior art character image extraction approaches analyze a single frame of image information to extract character image information. However, the inventors have realized that additional information is available in successive video frames containing textual information. The information in multiple video frames can desirably improve the performance of the character image extraction function.

In accordance with principles of the present invention, a method for extracting an image representing textual information from a video sequence includes the following steps. First, receiving a sequence of video frames, each including an image of textual information. Then, locating the textual information in each frame of the video sequence to form a stack of text arrays, each array containing data representing substantially only the textual information. Finally, extracting a single textual image array representing the image of the textual information from the stack of text arrays.

In accordance with another aspect of the invention, apparatus for extracting an image representing textual information from a video sequence includes a source of a video sequence having a plurality of frames, each containing an image of the textual information; and a processor, coupled to the video sequence source, responsive to all of the plurality of frames, for generating a single array representing an image of the textual information.

Figure 1:
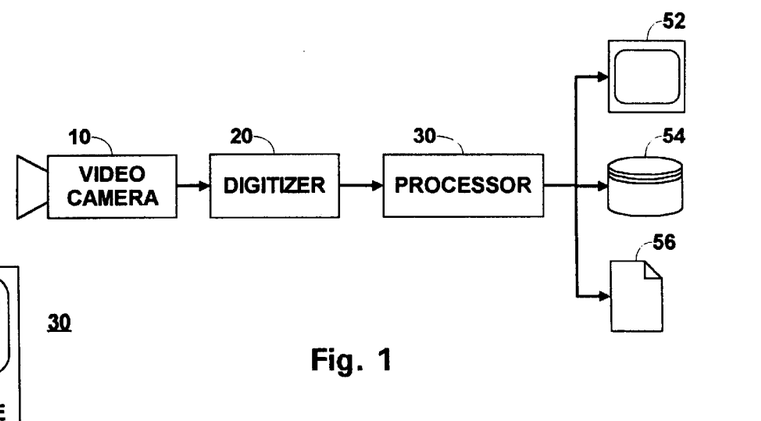
FIG. 1 is a block diagram of a system for locating, extracting and recognizing textual information from a sequence of video frames.

FIG. 1 is a block diagram of a system for locating, extracting and recognizing textual information from a sequence of video frames. The system illustrated in FIG. 1 will be described in terms of processing license plate textual information contained in a video sequence. One skilled in the art, however, will understand that the principles of the present invention are applicable to any application in which textual information is present in a video sequence.

In FIG. 1, an output terminal of a video camera 10 is coupled to an input terminal of a digitizer 20, and an output terminal of the digitizer 20 is coupled to an input terminal of a processor 30. An output terminal of the processor 30 is coupled to respective input terminals of a display unit 52, a storage unit 54 and a hard copy unit 56.

In operation the video camera 10 is positioned to scan an area in which cars will pass, such as the entrance or exit of a parking garage. The video camera 10 produces a video signal representing the rasterized scene in a known format. The video signal consists of a sequence of video frames, each frame having a predetermined number of horizontal lines. The raster may be represented by separate signals for each of three color components, e.g. red (R), green (G) and blue (B); or a composite signal with black and white (luminance) and color (chrominance) components. In the illustrated embodiment, only the luminance component is processed. The luminance component may be produced from color component signals, R, G, and B, in a known manner, or the luminance component may be separated from the chrominance component, also in a known manner.

The luminance component of the video signal from the video camera 10 is digitized in a known manner by the digitizer 20. In the illustrated embodiment, the digitizer 20 includes an analog-to-digital converter (not shown) which converts the analog luminance component to a stream of multibit digital samples. A predetermined number of samples are taken at predetermined locations, termed pixels, within each horizontal line of the raster, and each sample has a predetermined number of bits. The value of the sample represents the brightness of the scene at the location of that pixel. These digitized samples are then processed in the processor 30 to recognize the characters in a license plate of a car scanned by the video camera 10. This processing will be described in more detail below. The results of this processing are then supplied to one or more of the output devices attached to the processor 30. For example, the license plate number may be displayed on the display device 52 for an attendant to read; or it may be stored on a storage unit 54, such as a disk or tape drive unit for later retrieval and processing when, for example, parking bills are generated; or it may be printed out on the hard copy unit 56 to be read later.

Figure 2:
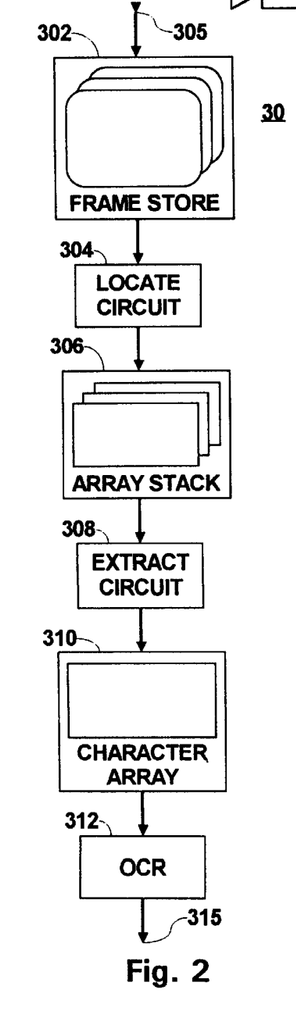
FIG. 2 is a more detailed block diagram of a processor in the system illustrated in FIG. 1.

FIG. 2 is a more detailed block diagram of a processor in the system illustrated in FIG. 1. In FIG. 2, an input terminal 305 of the processor 30 is coupled to an output terminal of the digitizer 20 (of FIG. 1). The input terminal 305 is coupled to an input terminal of a frame store 302. An output terminal of the frame store 302 is coupled to an input terminal of a license plate image locate circuit 304. An output terminal of the locate circuit 304 is coupled to an input terminal of an array stack memory 306. An output terminal of the array stack memory 306 is coupled to an input terminal of a character image extract circuit 308. An output terminal of the extract circuit 308 is coupled to an input terminal of a character array memory 310. An output terminal of the character array memory 310 is coupled to an input terminal of optical character recognition (OCR) circuitry 312. An output terminal of the OCR circuit 312 is coupled to an output terminal 315 of the processor 30. The output terminal 315 is coupled to the respective input terminals of the display unit 52, the storage unit 54 and the hard copy unit 56 (of FIG. 1).

Figure 3:
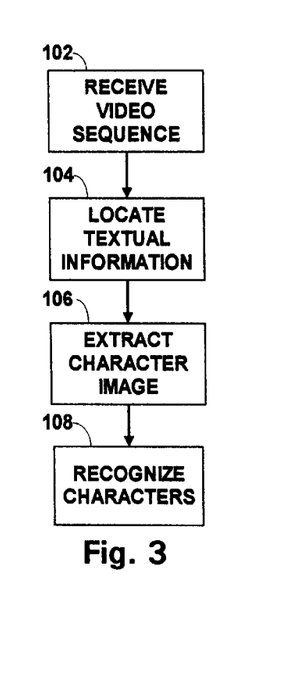
FIG. 3 is a flow chart of the overall processing of the video sequence according to the present invention.

The operation of the processor 30 illustrated in FIG. 2 may be better understood by referring to FIG. 3. FIG. 3 is a flow chart of the overall processing of the video sequence which occurs in the processor 30 according to the present invention. In FIG. 2, the video sequence of an image of a car with a license plate visible is received at input terminal 305 from the video camera 10 and digitizer 20 (of FIG. 1), and stored in the frame store 302, as illustrated in block 102 of FIG. 3. The video sequence consists of a sequence of a plurality of video frames each containing an image of the license plate. Each frame consists of an array of pixels arranged in a plurality of rows, each row containing a plurality of pixels, each pixel represented by a multibit digital sample whose value represents the brightness or color of the pixel, all as described above.

The contents of the frame store 302 are retrieved and processed by the license plate image locate circuit 304 to locate and isolate the license plate image, as illustrated in block 104 of FIG. 3. The result is a stack of fixed size arrays of pixels, each array corresponding to a respective frame in the video sequence containing an image of the license plate, as illustrated in block 104 of FIG. 3. This stack of arrays is stored in the license plate image array stack 306. Each such array has a predetermined number of rows, and each row has a predetermined number of pixels. Each array represents an image of substantially only the license plate. The processing performed in the license plate image locate circuit 304, illustrated in block 104 of FIG. 3, will be described in more detail below.

The stack of license plate representative arrays is retrieved from the license plate array stack 306 and processed by the character extract circuit 308 to extract the image of the characters on the license plate, as illustrated in block 106 of FIG. 3. The extracted character image is stored in the character image array 310. Because the license plate is assumed to consist of dark (black) characters on a light (white) background, the character representative image in the character image array 310 consists of black characters on a white background. Put more simply, each pixel in the license plate image represents either character or background. The result of the processing in the character extract circuit 308, illustrated in block 106, is a single array of binary pixels stored in the character image array 310, each pixel being either a logic '1' (representing character) or a logic '0' (representing background). The processing performed in the character extract circuit 308, illustrated in block 106, will be described in more detail below.

The characters in the extracted license plate image in the character image array 310 are then recognized, using known optical character recognition (OCR) techniques, by the OCR circuit 312, as illustrated in block 108. The result of this processing is computer readable data representing the characters on the license plate. This data may then be displayed on the display unit 52, stored in the memory unit 54, and/or printed on the hard copy unit 56 (of FIG. 1), as described above. OCR techniques for recognizing characters from character images are well known, and will not be discussed further.

Figure 4:
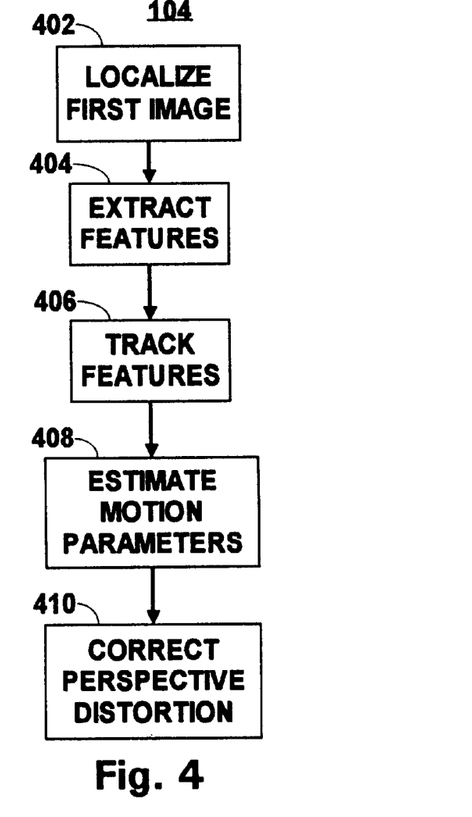
FIG. 4 is a more detailed flow chart illustrating the method of locating the image textual information within each of the sequence of video frames.

FIG. 4 is a more detailed flow chart illustrating the method of locating the license plate image (FIG. 3: 104) within each of the sequence of video frames of the moving car. There are several problems which occur in such a locating procedure. First, the image of the license plate is a small portion of the image in each frame of the video sequence. Second, the location of the license plate within each frame of the video sequence changes due to the motion of the car. Third, the plane of the license plate is not necessarily parallel to the focal plane of the video camera, so there is may be perspective distortion in the image of the license plate. Finally, the car may accelerate, or decelerate or change direction during the time it is in the view of the video camera, thus, both the expected location and the perspective of the license plate may change from frame to frame.

As described above, a sequence of video frames is received from the video camera 10 and digitizer 20 (of FIG. 1) and from the processing of block 102 (of FIG. 3). As described above, the license plate is assumed to be textual in nature, consisting of dark characters on a light background. It is known that the spatial variance of an image is higher in the area of textual information than the remainder of the image. Thus, in block 402, the spatial variance of a first one of the sequence of video frames is calculated along a line nominally parallel to the license plate direction, in a known manner. The area with relatively high spatial variance is assumed to be the license plate image. Because the general area where the license plate image is likely to appear is known, independent of the movement of the vehicle, only that general area in the image need be processed in this manner. In addition, because the nominal size of the license plate is known, spurious textual areas which are the wrong size can be rejected.

Once the license plate image is located in the first video frame of the sequence, various features of that image are extracted in block 404. These features are then tracked from frame to frame, in a manner to be described below, to track the motion of the car. For each pixel at location (x,y) within the license plate area, an array A, whose elements are sums of the products of partial derivatives taken in a 5×5 pixel window, is calculated (equation (1)). The second eigenvalue of this matrix $$A = \begin{bmatrix} \sum I_x^2(x,y) & \sum I_x(x,y)I_y(x,y) \\ \sum I_x(x,y)I_y(x,y) & \sum I_y^2(x,y) \end{bmatrix} \quad (1)$$

is used as a rank of that pixel (x,y). This rank is used to rate of all the pixels in the license plate image area. A predetermined number of pixels with the highest ratings are used as features that represent the license plate image area. In the illustrated embodiment, the top 30 such feature pixels are chosen as features representing the license plate area, and will be tracked through the remainder of the video sequences.

The features extracted in block 404 permit the parameters of the trajectory of the license plate from frame to frame to be estimated in block 406. By these trajectory parameters, the location of the license plate from frame to frame in the video sequence is tracked in a known manner. Because the car is traveling along the road, the trajectories of the feature points on the license plate are parallel in 3D space, and those trajectories all have the same vanishing point $V=(V_x, V_y)$ in the image plane. The set of n feature points (n=30 in the illustrated embodiment) $P=\{(x_i,y_i)|i=1,2,\ldots,n)\}$ in the current image will become points $P'=\{(x'_i,y'_i)|i=1,2,\ldots,n)$ $$x'_i = V_x + (1-t)x_i$$
$$y'_i = V_y + (1-t)y_i \quad (2)$$

in the next frame in the sequence according to equation (2).

To track the movement of the license plate, trajectory parameters t, r and c are calculated, in a known manner, such $$\sum_{i=1}^{n}(\|I(x_i,y_i)-I(x'_i+r,y'_i+c)\|^2+\|G(x_i,y_i)-G(x'_i+r,y'_i+r)\|^2) \quad (3)$$

that equation (3) is minimized, where the parallel line brackets represent distance, I represents the intensity and G represents the gradient. As is known, both intensity and edgeness may be used in the tracking. In the illustrated embodiment, the trajectory parameters r and c are both constrained to values between –3 and 3 in order to provide some local refinement in the case where the car changes direction, and the vanishing point estimation has some errors. The minimization is performed via a search, in a known manner. The search is unidirectional and very fast.

The tracked feature points P provide correspondences which are necessary to estimate motion parameters, in a known manner, in block 408. Because license plates are planar objects, only warping parameters need be calculated in order to correct the perspective distortion in each of the frames in the video sequence. From the correspondences, warping coefficients may be calculated in a known manner. In the illustrated embodiment, warping coefficients $p_1$, $p_2$, $p_3$, $p_4$, $p_5$, $p_6$, $p_7$ and $p_8$ may all be calculated if four correspondences are known.

When the warping coefficients have been calculated, they are used in block 410 to correct for perspective distortion, and to transform the images of the license plate from the frames in the video sequence into a stack f of rectangular pixel arrays $f^1$, each having a size of $N_1 \times N_2$. In the illustrated embodiment, each license plate pixel array is 40 rows of 280 pixels. Each pixel $(x_i,y_i)$ in the license plate image portion of each frame of the video sequence is transformed into a corresponding pixel $(f^1_{i,j})$ a corresponding one of the license plate arrays $f^1$ using a $$i'=i+p_1i+p_2j+p_5+p_7i^2+p_8ij$$
$$j'=j+p_3i+p_4j+p_6+p_7ij+p_8j^2 \quad (4)$$

known planar surface motion model (equation (4)). As described above, the result of localizing the license plate image in the video sequence is a stack of n rectangular arrays having $N_1$ rows of $N_2$ pixels each, each array representing an image of substantially only the license plate corrected for motion and perspective.

Referring again to FIG. 3, the stack f of license plate representative arrays from block 104 is processed by block 106 to extract the character image. This character image is a single $N_1 \times N_2$ array I of pixels. Each pixel in I is a single bit having a logic '1' value indicating that this pixel is a character pixel, or a logic '0' value indicating that this pixel is a background pixel. The process of generating such an array is termed a labeling problem, in which each pixel in I is labeled as belonging to either a character or the background. It is important that the image in I be as accurate a representation of the actual license plate as possible so that the optical character recognition in block 108 also is as accurate as possible.

The stack f of license plate arrays may be considered as forming a binary random field z of size $N_1 \times N_2$. Processing of the stack f to generate the character image I is based on modeling the field z, in a well known manner, as a binary Markov random field. In a Markov random field, the probability that the random field (license plate array) z all sets of values s are $$P(z=s)>0 \quad (5)$$

possible (equation (5)); and the conditional probability that any particular element $Z_{i,j}$ in the field has a particular value $s_{i,j}$, given the values of the other elements in the field, is equal to the conditional probability that that element has that value given the values of neighboring elements only (equation (6)).

$$P(z_{i,j}=s_{i,j}|z_{k,l}, s=_{k,l},(i,j)\neq(k,l))=P(z_{i,j}=s_{i,j}|z_{k,l}=s_{k,l},(k,l)\in g_{i,j}) \quad (6)$$

That is, each element is affected only by its neighboring elements. In equation (6), $g_{i,j}$ represents the neighborhood of element (i,j). In defining the neighborhood of an element, an element (i,j) is not in its own neighborhood, and an element $$(i,j) \notin g_{i,j}$$

$$(i,j) \in g_{k,l}, \text{ if and only if } (k,l) \in g_{i,j}, \forall (i,j), (k,l) \in z \quad (7)$$

(i,j) is in the neighborhood of element (k,l) if and only if element (k,l) is in the neighborhood of element (i,j) (equation (7)).

An important feature of a Markov random field is that its joint probability density function has a general form known as the Gibbs distribution function. A Gibbs distribution function is based on the concept of cliques. A subset of the elements of the random field z is a clique C ($C \subseteq z$) if and only if every pair of distinct pixels in C are neighbors, as defined in equation (7). A Gibbs probability distribution function P(z) is $$P(z) = \frac{1}{Z} \exp^{-U(z)/T} \text{ where} \quad (8)$$

$$U(z) = \sum_{c \in C} V_c(z) \text{ and } Z = \sum_{\text{all } z^l} \exp^{-U(z^l)/T}$$

represented by equation (8). In equation (8), U(z) is termed the Gibbs energy function, T is the temperature parameter, $V_c(z)$ is the clique energy function for clique c, and Z is the normalization factor. In the illustrated embodiment, the temperature parameter T is set to the value 1. The clique energy functions $V_c(z)$ may be arbitrarily defined, so long as they depend only on elements in the corresponding cliques C.

In the illustrated embodiment, it is assumed that in general, neighboring binary pixels (field elements) in the license plate image (field) are most likely to have the same labels: either character or background. That is, pixels in the neighborhood of a character pixel are most likely to be other character pixels, and pixels in the neighborhood of background pixels are most likely to be other background pixels. Also, in general, boundaries between characters and background are most likely to be horizontal or vertical boundaries. Thus, in the illustrated embodiment, the clique energy functions $V_c(s)$ are defined, in a manner described in more detail below, to promote consistency in labeling among neighboring pixels, and promote horizontal or vertical boundaries.

Figure 6:
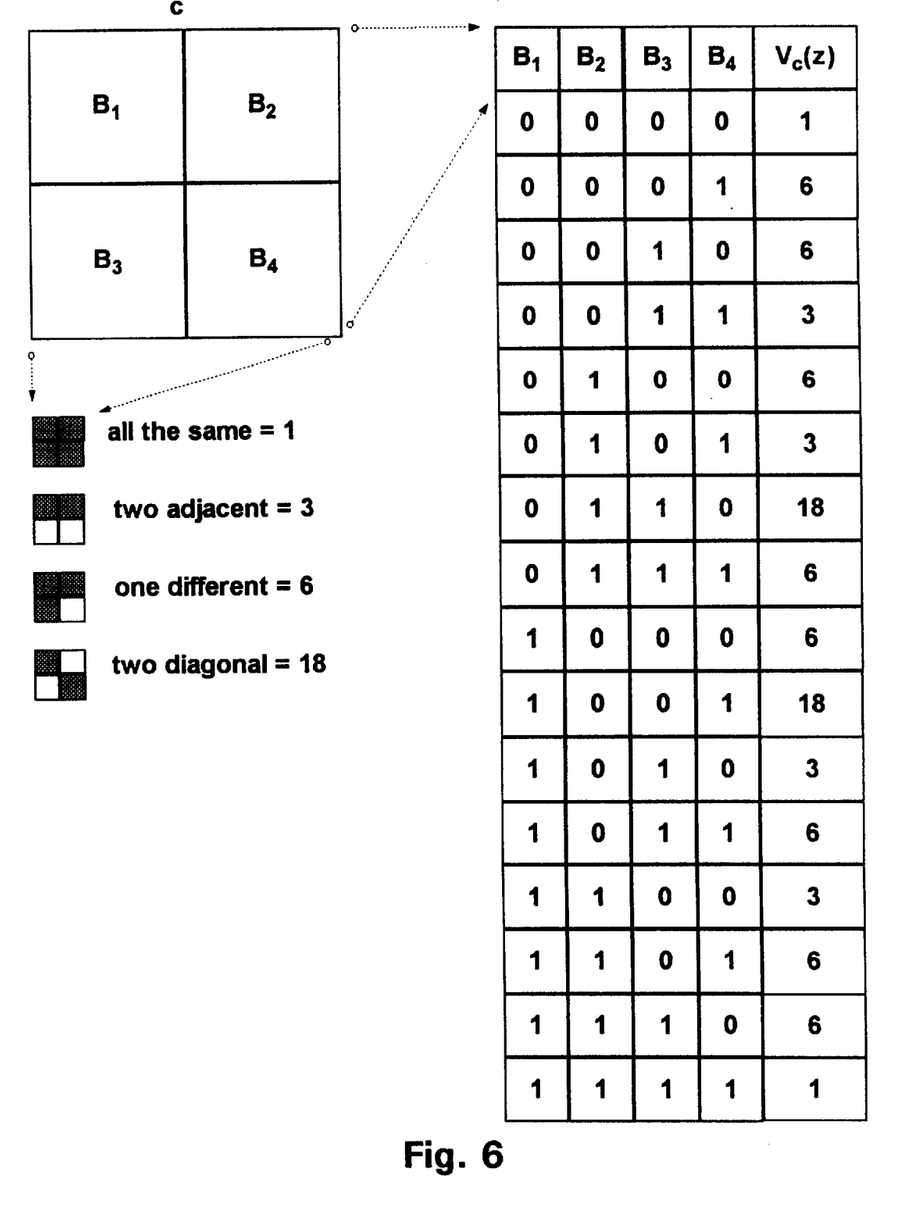
FIG. 6 is a diagram illustrating a clique, and clique energies according to the present invention.

FIG. 6 is a diagram illustrating a clique c, and clique energies $V_c(z)$ according to the present invention. In the illustrated embodiment, the neighborhood $g_{i,j}$ of a pixel (i,j) is defined as the set of pixels adjoining pixel (i,j) (sometimes termed a second order, or eight-neighbor, neighborhood) and a clique c for such a neighborhood is illustrated in FIG. 6. While other cliques exist for such a neighborhood system, they are ignored in the illustrated embodiment, and their contribution to the summation of clique energies in equation (8) is defined to be zero. In the clique c illustrated in FIG. 6, four squares, $B_1$, $B_2$, $B_3$ and $B_4$ each represent a pixel in z. The pixel (i,j) is pixel $B_1$ although pixel (i,j) may be considered to be any of the pixels $B_1$, $B_2$, $B_3$ or $B_4$. An examination of equation (8) will indicate that the higher the clique energies, the lower the joint probability, and the lower the clique energies, the higher the joint probability. Thus, more desirable clique configurations are assigned lower energy values than less desirable configurations in order to maximize the probability function.

As described above, the clique energy functions are defined to promote consistency in labeling among the pixels in the clique, and to promote horizontal or vertical boundaries. This is illustrated by the four small squares immediately below the clique c in FIG. 6. These small squares, divided into four smaller squares, each represents a configuration of the clique c, in which shaded smaller squares represent pixels having one label (e.g. either character or background) and blank smaller squares represent pixels having the other label.

The topmost small square represents a situation in which all four pixels have the same label. This configuration includes pixels with labeling which is completely consistent. This is the most desirable configuration, and thus is assigned the lowest clique energy value 1. The next small square down represents one of two configurations in which two adjacent pixels have the same label, and the other two pixels (also adjacent) have the other label. The illustrated configuration represents a horizontal boundary, while the other configuration (not illustrated) represents a vertical boundary. While not as desirable as a clique in which all pixels have the same label, this is a relatively desirable configuration, and is assigned the clique energy 3.

The next small square represents one of four configurations in which one of the pixels has a label different from the other three. This represents a diagonal boundary, which is less desirable. However, it also has three pixels with consistent labels. This configuration is assigned the clique energy 6. The bottommost small square has two diagonal pixels with one label, and the other two diagonal pixels with the other label. This configuration represents a diagonal line, and includes pixels half of which have one label, and half of which have the other label. This is the least desirable configuration, and is assigned the relatively high clique energy of 18.

The table on the right hand side of FIG. 6 is a table setting out all sixteen possible configurations of the four pixels $B_1$ through $B_4$ in the clique c. In the table the leftmost column represents the label of the upper left pixel B1, the next column represents pixel B2 and so forth. The rightmost column represents the clique energy value $V_c(z)$. Each row of the table represents one configuration of the labels of the pixels in the clique c pixels, in which the label 0 represents a background pixel and the label 1 represents a character pixel, and the corresponding clique energy for that configuration.

The character image extraction operation is formulated, in a well known manner, as a Bayesian maximum a posteriori (MAP) estimation problem. The MAP estimate I of the actual license plate image L is the estimate which maximizes the conditional probability density function, described above, given each array $f^1$ in the stack f of license plate image arrays (equation (9)).

$$I=\max P(L|\{f^i\}) \quad (9)$$

This is known to be equivalent to the maximum of the log-likelihood function (equation (10)). Bayes' theorem, is then $$I=\arg \max \log P(L|f^1, f^2, \ldots, f^n) \quad (10)$$

applied, in a known manner (equation (11)). In equation (11), $$I = \arg\max \{\log P(L) + \log P(f^1, f^2, \ldots, f^n | L)\} \quad (11)$$

P(L) is the a priori joint probability, and is the Gibbs distribution function given in equation (8) above. The conditional probability in the second term is the probability that a particular set of values $s^1$ will occur in the stack f of license plate images, given the actual license plate image L.

Finally, each respective extracted license plate image array $f^1$ in the stack of arrays f is assumed to be independent of all the other such images. Thus, the complete conditional probability density from equation (11) may be written as given in $$P(f^1, f^2, \ldots, f^n | L) = \prod_{l=1}^{n} P(f^l | L) \quad (12)$$

equation (12). The product operator in equation (12) multiplies the respective conditional probabilities that any single image array $f^1$ in the stack of images (arrays) f is produced by step 106 (of FIG. 3) given the actual license plate image L. This is termed the observation probability. In the illustrated embodiment, the observation $f^1$ is assumed to include noise in the form of zero mean Gaussian white noise of variance σ. The conditional probability of an observation, in the form of one of the arrays $f^1$ in the stack of arrays, given the license plate image L is assumed to be expressed in equation (13). This is the $$P(f^l | L) = \frac{1}{(2\pi\sigma_l^2)^{N_1 N_2 / 2}} \exp^{-\frac{\|L - f^l\|^2}{2\sigma_l^2}} \quad (13)$$

probability for an observation in the presence of Gaussian noise.

Incorporating equations (8) and (13) into equation (11) results in equation (14). In equation (14), z is the estimated $$I = \operatorname{argmin}\left\{\sum_{c \in C} V_c(z) + \sum_{l=1}^{n} \frac{\|z - z^l\|^2}{2\sigma^2}\right\} \quad (14)$$

license plate image, and the summation operator in the first term of the bracketed expression forms the sum of the clique energy function for each pixel in that estimated image, using the clique energies described in FIG. 6. In the summation operator in the second term of the bracketed expression, the parallel lines in the numerator represents the distance between the estimated license plate image z and the $1^{th}$ array $f^1$ in the stack of arrays f. For a binary array, the distance is the number of corresponding pixels which have different values between the two array operands. The estimated license plate image z which results in minimizing the bracketed expression is provided as the license plate image I. Equation (14) cannot be solved directly, nor is it differentiable, so gradient-based minimization techniques cannot be used. But, well known genetic algorithm search techniques may be used to search for a minimum solution.

In genetic algorithms, a population is first processed to select the more desirable individuals to propagate to the next generation. This process is known as 'selection', and will be described in more detail below. The selected individuals are then manipulated by processes called 'crossover', and 'mutation', also described in more detail below. The results of these processes are passed on to the next generation, where the selection, crossover, and mutation processes are repeated until the optimum solution (fittest individual) is determined.

More specifically, an initial population is generated. Then the respective fitnesses of the individuals in the population are evaluated. Selected individuals having relatively higher fitnesses are admitted to an intermediate generation. Random individuals in the intermediate generation are allowed to 'crossover'. Also random mutations of randomly selected individuals also occur. These individuals form the new generation.

Figure 5:
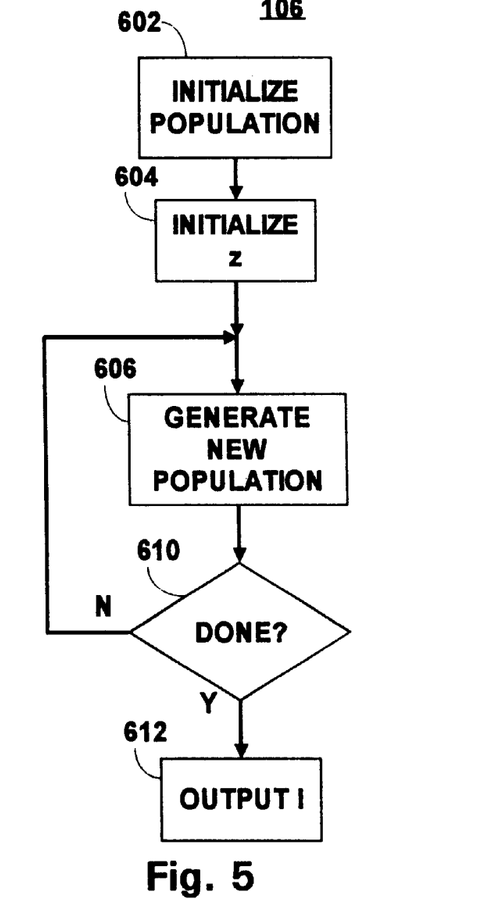
FIG. 5 is a more detailed flow chart illustrating the method of extracting the character image data from the previously located license plate images.
Figure 7:
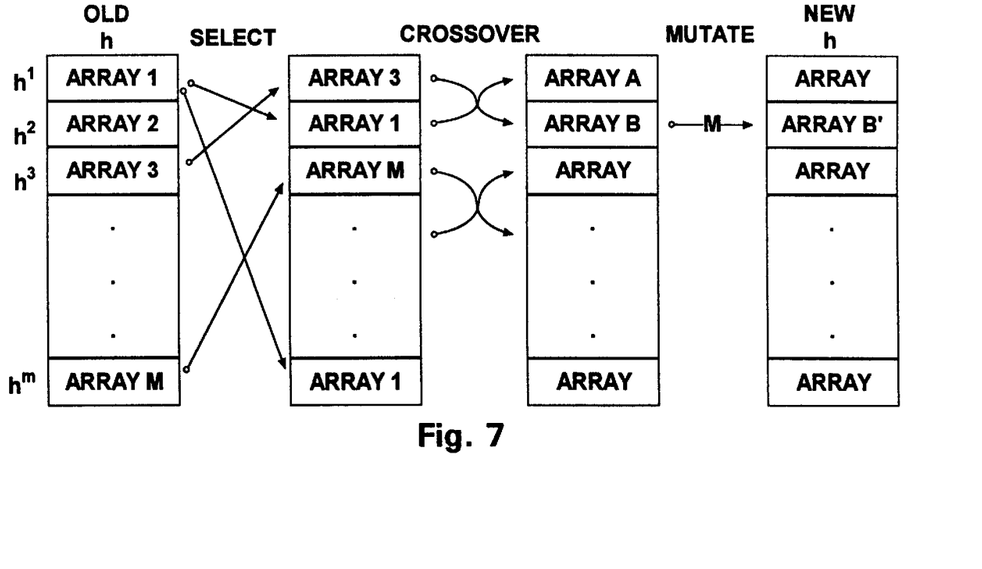
FIGS. 7 and 8 are diagrams useful in understanding the operation of the genetic algorithm used in a system according to the present invention.
Figure 8:
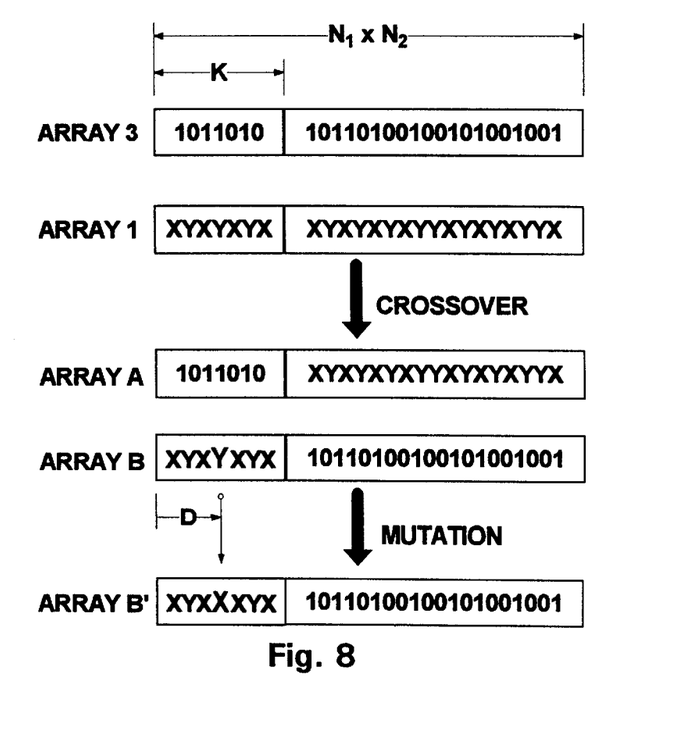

FIG. 5 is a more detailed flow chart illustrating the method 106 of extracting the character image data from the previously located license plate images $f^1$, and FIGS. 7 and 8 are diagrams useful in understanding the operation of the process illustrated in FIG. 5. In block 602, the initial population is formed from the stack f of license plate image arrays $f^1$. Each pixel in each array $f^1$ is initially converted to a binary digit (bit) in a corresponding binary array $h^1$ using any of the known techniques, such as global thresholding, described above. One skilled in the art of genetic algorithms will understand, however, that the bits in the initial population could also have been assigned randomly. The result is a stack h of M binary arrays $h^1$.

Each array $h^1$ in the stack h of arrays will be referred to below in genetic algorithm terms as an individual, and the stack h of arrays will be referred to as the population. As will be described in more detail below, the desirability of each individual (array $h^1$) in the initial population (stack h) is evaluated by application of the expression in braces in equation (14), termed the objective or evaluation function. The smaller that expression is, the more desirable that individual. However, from equation (14) it may be seen that the variable z, referring to an estimate of the license plate image, has not yet been derived. In order to provide a value for this variable for the initial generation, in block 604 a first estimate z is generated by a pixel-by-pixel majority voting amongst the arrays $h^1$ in the stack h of arrays.

Referring to FIG. 7, the process of producing a new generation from an old generation is illustrated. In FIG. 7, the stack h of binary arrays is illustrated by a rectangle in which each array $h^1$ in the stack is illustrated by a smaller rectangle. The leftmost rectangle represents the old generation. In block 606 of FIG. 5, the new generation is produced. Each individual (array $h^1$) is reproduced according to a fitness function. The fitness of each individual is determined by the value of its objective function, relative to those of the other individuals $$P_{h^l} = \frac{1/g(h^l)}{\sum_{j=1}^{M}(1/g(h^j))} \quad \text{where} \quad (15)$$

$$g(h^l) = \sum_{c \in C} V_c(h^l) + \sum_{j=1}^{n} \frac{\|z - h^j\|}{2\sigma^2}$$

(equation (15)). In equation (15), $P_{h1}$ is the fitness function of individual $h^1$, and $g(h^1)$ represents the result of the evaluation of the objective function, e.g. the expression in braces in equation (14), for individual $h^1$. In block 606, M individuals from the initial population are selected based on the relative values of their fitness functions $P_{h1}$. Any one of several known techniques for selecting M individuals with respective probabilities as given in equation (15) may be used. The result is M individuals in an intermediate generation illustrated in the second rectangle in FIG. 7. In FIG. 7, the individuals are illustrated as being in random order, although it is also possible to produce the individuals in any order in this intermediate generation. In this intermediate generation, some individuals from the old generation may be represented more than once (e.g. ARRAY 1), while other individuals from the past generation may not occur at all (e.g. ARRAY 2).

From the intermediate population, random individuals are crossed over. FIG. 8 illustrates a crossover operation in more detail. Each array $h^1$ in the stack of arrays h may be arranged as a string of $N_1 \times N_2$ bits. For example, the array may be traversed in raster scan order (i.e. row-by-row), or column-by-column, or any other order. A pair of individuals (arrays) is then chosen at random. Then, with a probability $\chi$, these two individuals are crossed over. In the crossover operation, a bit location K, where $1 < K < N_1 \times N_2$, is selected randomly. The bits from location K to the end of one array are exchanged with the corresponding bits from the other array.

Referring specifically to FIG. 8, the topmost rectangle represents the contents of the individual array 3 in which a '1' represents a character bit, and a '0' represents a background bit. The second rectangle represents the contents of the individual array 1 in which 'X' represents a character bit and a 'Y' represents a background bit. The next two rectangles represent the results of the crossover operation on these two individuals in which array A has the initial bits from array 3 and the remaining bits from array 1, and array B has the initial bits from array 1 and the remaining bits from array 3. Referring again to FIG. 7, the third rectangle represents the results of the crossover operations. Because in FIG. 7 it is assumed that the result of the select process is a stack arrays in random order, adjacent arrays may be crossed over. However, if arrays are produced in any other order by the select process, then arrays are selected in some random manner to be crossed over.

After the crossover operation, a mutation step occurs. In a mutation step, randomly selected individuals have a randomly selected bit D, where $1 \leq D \leq N_1 \times N_2$ inverted with a probability $\mu_1$. The probability $\mu_1$ is a relatively low probability. Referring again to FIG. 8, array B is assumed to have been selected with probability $\mu_1$. Randomly selected bit location D is the fourth bit, and is in larger type than the other bits for illustrative purposes only. In array B, the bit at location D has the value Y (i.e a background pixel). This bit is inverted to the value X (i.e. a character pixel) to form a mutated individual, array B', in which the mutated bit is in larger type than the other bits for illustrative purposes only. Referring again to FIG. 7, the second individual in the third rectangle, array B, (the result after crossover) is selected for mutation, and becomes array B' in the new generation illustrated in the rightmost rectangle in FIG. 7.

Due to the random nature of the selection operation, described above, the fittest individual is not guaranteed to survive from one generation to the next. Thus, an extremely good solution to the problem may be discovered and subsequently lost. Thus, in the illustrated embodiment, a known elitist selection process is used. An elitist selection process operates substantially the same as the selection process described above, except that the fittest individual in the old generation always survives to the next generation (i.e. is selected with a probability of one). Also, the crossover and mutation operations, also described above, randomly explore the solution space searching for the optimum solution. This is a relatively inefficient search strategy, however. In order to search more efficiently, a locally greedy mutation operation is used instead.

In a locally greedy mutation operation, the desirability of the individual selected for mutation $g(h^1)$ is calculated (according to the expression in braces in equation (14)) before the proposed mutation. A bit location D is then randomly selected and inverted as described above. The desirability of the mutated individual $g(h^1)$ is then calculated. If the desirability of the mutated individual $g(h^1)$ (i.e. the individual with the $D^{th}$ bit inverted) is higher than the desirability of the original (unmutated) individual $g(h^1)$, then the mutation is made with a probability $P^f$ of $\mu_1$. Otherwise, the mutation is made with a probability $P^f$ of $\mu_2$, in which $0 < \mu_2 < \mu_1$ (equation (16)). By selecting a mutated individual with a higher $$P^f = \begin{cases} \mu_1 & \text{if } g(h^l) < g(h^{l'}) \\ \mu_2 & \text{otherwise} \end{cases} \quad (16)$$

where $0 < \mu_2 \mu_1$ probability if it is a more desirable individual and with a lower probability if it is a less desirable individual, the search is made more efficient. Because only a few bits in the neighborhood of the inverted bit need to be analyzed to determine the difference in the desirabilities of the original and mutated individual, this is not an time consuming operation. A non-zero probability $\mu_2$ is necessary to prevent the genetic algorithm from getting stuck at a local minimum which is not the global minimum.

Referring again to FIG. 5, in block 610, if the genetic algorithm is completed, then the most desirable individual $h^1$ in the final generation is produced as the character image I of the license plate in the video sequence. This test to determine if the genetic algorithm is completed, also referred to as converged, may involve monitoring the generations and/or the desirabilities of the individuals from generation to generation to determine whether a global minimum has been found. In a system, where the search space is finite (i.e. there are only a finite number of possible sets of values an individual can take, and a finite number of individuals in the population) the genetic algorithm is guaranteed to converge.

However, there is a class of problems, termed simple greedy problems, for which the search space is convex, meaning that for any individual $h^1$ there always is a bit, j, which, if inverted in $h^1$, will result in a more desirable individual $h^{1'}$ (equation $(\forall h^l \exists j$ such that $g(h^{l'}) < g(h^l))$ where $h^{l'} = h^l$ with $j^{th}$ bit inverted (17)

(17). For this class of problems, the inventors have discovered that, for a population of N individuals, the genetic algorithm population will contain a globally optimum solution after a number of iterations on the order of log(N) iterations. Thus, the test to determine if the genetic algorithm has converged can simply be a test to determine when a fixed number of iterations, on the order of log(N), has been performed. For simple greedy problems, finding the global minimum is both guaranteed and fast.

In the illustrated embodiment, the population size (number of binary license plate arrays) is selected to be 100 arrays; each array contains 40 rows of 280 pixels each; the crossover probability $\chi$ is set to 0.001; $\mu_1$ is set to 0.9, and $\mu_2$ is set to 0.1. It is assumed that this is a simple greedy problem. It has been found that 20 iterations is adequate to provide an approximation of the globally optimum solution.

Referring again to FIG. 2, the character image I is produced by the character image extract circuit 308, as illustrated in block 106 of FIG. 3 is stored in the character image array 310 block 106. This character image I is then processed by known optical character recognition circuitry 312, illustrated in block 108 of FIG. 3, to produce computer readable data representing the characters on the license plate in the video sequence.

One skilled in the art will understand that the processor 30, illustrated in FIGS. 1 and 2, may be implemented as a single processor, such as a microprocessor, coupled to a memory which functions as the frame store 302, array stack 306, and character array 310. The microprocessor processes the data in the memory, and operates as the license plate locating circuit 304, performing the step in block 104 of FIG. 3; as the character image extracting circuit 308, performing step in block 106 of FIG. 3; and as the optical character recognizing circuit 312, performing the step in block 108 of FIG. 3. Alternatively, a parallel hardware approach is suitable for the present invention because the processing performed on the image data is local due to the Markov random field model. In a parallel hardware approach, separate processors may be assigned to separate portions of the arrays being processed, all performing their processing in parallel, and passing their results to a central processor for final integration and control.

What is claimed is:

1. An apparatus for extracting an image representing textual information from a video sequence, comprising:
   a source of a video sequence having a plurality of frames, each containing an image of the textual information; and
   a processor, coupled to the video sequence source, responsive to all of the plurality of frames, for generating a single array representing an image of the textual information, wherein the processor comprises:
     a circuit, coupled to the video sequence source, for locating the textual information image in each of the plurality of frames and generating a stack of text image arrays, respectively corresponding to the plurality of frames, each containing an image which is substantially only of the textual information; and
     a circuit, coupled to the locating circuit, and responsive to all of the arrays in the stack of text arrays, for extracting an image of the textual information into a single array, wherein the extracting circuit comprises:
       circuitry, responsive to the stack of text arrays, for generating a stack of binary arrays, respectively corresponding to the stack of text arrays, each binary array containing binary data representing the textual information image in the corresponding text array;
       circuitry, responsive to the stack of binary arrays, for performing a genetic algorithm search using the stack of binary arrays as an initial population to find an optimum binary image; and
       providing the optimum binary image in the single array as the textual information image.

2. The apparatus of claim 1 wherein the genetic algorithm circuitry comprises circuitry for:
   selecting individual arrays from the stack of binary arrays, from a population which will survive to the next generation according to the relative desirability of the individual arrays;
   crossing-over random pairs of selected individual arrays with a probability $\chi$;
   mutating random selected individual arrays with a probability $\mu_1$, wherein the selected, crossed-over and mutated individual arrays form a stack of binary arrays representing a new generation; and
   repeating the selecting, crossing-over and mutating steps.

3. The apparatus of claim 1 wherein the genetic algorithm circuitry comprises circuitry for performing, as a part of the genetic algorithm, a locally greedy mutation function.

4. The apparatus of claim 1 wherein the genetic algorithm circuitry comprises circuitry for performing, as a part of the genetic algorithm, an elitist selection function.

5. The apparatus of claim 1, wherein the locating circuit comprises:
   circuitry, responsive to a first array in the stack of video arrays, for locating the textual information image in a first video frame;
   circuitry, responsive to the located textual information image in the first one of the stack of video arrays, for extracting features of the textual information image in the first one of the plurality of frames;
   circuitry, responsive to subsequent arrays in the stack of video arrays, for tracking the extracted features from frame to frame in subsequent ones of the plurality of frames to produce estimates of motion parameters; and
   circuitry, responsive to the estimated motion parameters, for correcting for perspective distortion in the plurality of frames and produce the stack of arrays containing respective images which is substantially only of the textual information.

6. The apparatus of claim 1, further comprising:
   a frame store, coupled between the video sequence source and the locating circuit; and
   an array stack memory, coupled between the locating circuit and the extracting circuit.

7. The apparatus of claim 1, further comprising an optical character recognition circuit, coupled to the extracting circuit, for generating computer readable data representing the textual information.

8. The apparatus of claim 1, further comprising a digitizer, coupled between the video signal source and the processor, for generating a stack of arrays, respectively corresponding to the plurality of frames, each array containing data representing the image of the textual information.

9. The apparatus of claim 1, wherein the processor comprises optical character recognition circuitry responsive to the textual information image array for generating computer readable data representing the textual information.

10. Apparatus for extracting an image representing textual information from a video sequence, comprising:
   a source of a video sequence having a plurality of frames, each containing an image of the textual information; and
   a processor, coupled to the video sequence source, responsive to all of the plurality of frames, for generating a single array representing an image of the textual information;
   wherein the processor comprises:
     a circuit, coupled to the video sequence source, for locating the textual information image in each of the plurality of frames and generating a stack of text image arrays, respectively corresponding to the plurality of frames, each containing an image which is substantially only of the textual information; and
     a circuit, coupled to the locating circuit, and responsive to all of the arrays in the stack of text arrays, for extracting an image of the textual information into a single array;

wherein the extracting circuit comprises:
  circuitry, responsive to the stack of text arrays, for generating a stack of binary arrays, respectively corresponding to the stack of text arrays, each binary array containing binary data representing the textual information image in the corresponding text array;
  circuitry, responsive to the stack of binary arrays, for performing a genetic algorithm search using the stack of binary arrays as an initial population to find an optimum binary image; and providing the optimum binary image in the single array as the textual information image
wherein the genetic algorithm circuitry comprises circuitry for:
  selecting individual arrays from the stack of binary arrays, from a population which will survive to the next generation according to the relative desirability of the individual arrays;
  crossing-over random pairs of selected individual arrays with a probability $\chi$;
  mutating random selected individual arrays with a probability $\mu_1$ wherein the selected, crossed-over and mutated individual arrays form a stack of binary arrays representing a new generation; and
  repeating the selecting, crossing-over and mutating steps; and
wherein the selecting circuitry comprises circuitry for calculating the desirability $g(h^1)$ of an individual array $h^1$ according to the equation:

$$g(h^l) = \sum_{c \in C} V_c(z) + \sum_{j=1}^{n} \frac{\|z - h^j\|^2}{2\sigma^2}$$

where z is an estimate of the textual information image, $V_c(z)$ is the clique energy function, and $\sigma$ is the variance.

11. Apparatus for extracting an image representing textual information from a video sequence, comprising:
  a source of a video sequence having a plurality of frames, each containing an image of the textual information; and
  a processor, coupled to the video sequence source, responsive to all of the plurality of frames, for generating a single array representing an image of the textual information;
  wherein the processor comprises:
    a circuit, coupled to the video sequence source, for locating the textual information image in each of the plurality of frames and generating a stack of text image arrays, respectively corresponding to the plurality of frames, each containing an image which is substantially only of the textual information; and
    a circuit, coupled to the locating circuit, and responsive to all of the arrays in the stack of text arrays, for extracting an image of the textual information into a single array;
  wherein the extracting circuit comprises:
    circuitry, responsive to the stack of text arrays, for generating a stack of binary arrays, respectively corresponding to the stack of text arrays, each binary array containing binary data representing the textual information image in the corresponding text array;
    circuitry, responsive to the stack of binary arrays, for performing a genetic algorithm search using the stack of binary arrays as an initial population to find an optimum binary image; and providing the optimum binary image in the single array as the textual information image; and
  wherein:
    each array in the stack of binary arrays is arranged as a plurality of rows, each row having a plurality of pixels, each pixel having a binary value;
    the stack of binary arrays is modeled on a Markov random field having a second order neighborhood, and a single non-zero clique consisting of four pixels arranged in a square.

12. The apparatus of claim 11 wherein the value of the clique energy function for the single non-zero clique comprises:
  the value 1 when all pixels in the clique have the same value;
  the value 3 when two adjacent pixels have the same value, and the remaining pixels have the other value;
  the value 6 when one pixel has a different value than value of the remaining pixels; and
  the value 18 when diagonal pixels have the same value, and the remaining pixels have the other value.

13. A method for extracting an image representing textual information from a video sequence, comprising the steps of:
  receiving a sequence of video frames, each including an image of the textual information;
  locating the textual information in each frame of the video sequence to form a stack of text arrays, each array containing data representing substantially only the textual information;
  extracting a single textual image array representing the image of the textual information from the stack of text arrays, wherein the extracting step comprises the steps of:
    generating a stack of binary arrays, respectively corresponding to sequence of video frames:
    extracting the single textual image array from the stack of binary arrays by performing a genetic algorithm search using the stack of binary arrays as an initial population to find an optimum binary image; and
    providing the optimum binary image in the single array as the textual information image.

14. The method of claim 13 further comprising, after the extracting step, the step of recognizing the characters in the textual information image and generating computer readable data representing the textual information.

15. The method of claim 13 wherein the locating step comprises the steps of:
  locating the textual information in a first frame of the video sequence;
  extracting features of the textual information in the first frame of the video sequence;
  tracking the features of the textual information in subsequent frames of the video sequence;
  estimating motion parameters from the tracked features; and
  correcting perspective distortion in the textual information in each of the frames of the video sequence to generate the stack of text arrays.

16. The method of claim 13 wherein the genetic algorithm comprises the steps of:
  using the stack of binary arrays as an old generation;
  selecting individual arrays to survive to a next generation according to the relative desirability of the individual array;

crossing-over random pairs of selected arrays with probability χ;

mutating random selected arrays with probability $\mu_1$ to form a new generation;

repeating the selecting, crossing-over, and mutating steps with the new generation.

17. The method of claim 16 wherein the mutating step comprises the step of using a locally greedy mutation operation.

18. The method of claim 16 wherein the selecting step comprises the step of using an elitist selection operation.

19. A method for extracting an image representing textual information from a video sequence, comprising the steps of:

receiving a sequence of video frames, each including an image of textual information;

locating the textual information in each frame of the video sequence to form a stack of text arrays, each array containing data representing substantially only the textual information; and extracting a single textual image array representing the image of the textual information from the stack of text arrays;

wherein the extracting step comprises the steps of:
generating a stack of binary arrays, respectively corresponding to sequence of video frames;

extracting the single textual image array from the stack of binary arrays using a genetic algorithm;

wherein the genetic algorithm comprises the steps of:
using the stack of binary arrays as an old generation;
selecting individual arrays to survive to a next generation according to the relative desirability of the individual array;
crossing-over random pairs of selected arrays with probability χ;
mutating random selected arrays with probability $\mu_1$ to form a new generation;
repeating the selecting, crossing-over, and mutating steps with the new generation; and wherein the selecting step comprises the step of calculating the desirability $g(h^1)$ of an individual array $h^1$ according to the equation:

$$g(h^i) = \sum_{c \in C} V_c(z) + \sum_{j=1}^{n} \frac{\|z - h^j\|^2}{2\sigma^2}$$

where z is an estimate of the textual information array, V(z) is the clique energy function, and σ is the variance.

* * * * *